United States Patent [19]
Maurice et al.

[11] Patent Number: 5,791,025
[45] Date of Patent: Aug. 11, 1998

[54] SNAP-HOOK WITH A LOCKING BOLT

[75] Inventors: Alain Maurice, Gieres; Paul Petzl, Barraux, both of France

[73] Assignee: ZEDEL, Crolles, France

[21] Appl. No.: 915,577

[22] Filed: Aug. 21, 1997

[30] Foreign Application Priority Data

Aug. 30, 1996 [FR] France .................. 9610800

[51] Int. Cl.⁶ .................. A44B 21/00; A63B 29/00
[52] U.S. Cl. .................. 24/573.1; 24/616; 24/573.5; 24/599.9
[58] Field of Search .................. 24/573.1, 573.5, 24/599.1, 599.9, 68 J, 69 J, 71 J, 647, 667, 616, 615

[56] References Cited

U.S. PATENT DOCUMENTS

| | | | |
|---|---|---|---|
| 831,260 | 9/1906 | Bodauge | 24/573.5 |
| 4,930,194 | 6/1990 | Frechin | 24/573.5 |
| 5,287,645 | 2/1994 | Gois | 24/573.5 |
| 5,608,953 | 3/1997 | Petzl et al. | 24/573.1 |

FOREIGN PATENT DOCUMENTS

| | | |
|---|---|---|
| 2146703 | 3/1973 | France. |
| 2461146 | 1/1981 | France. |
| 9110358 | 1/1992 | Germany. |

Primary Examiner—Victor N. Sakran
Attorney, Agent, or Firm—Oliff & Berridge, PLC

[57] ABSTRACT

A snap-hook comprises a pivoting finger with a rotary locking ring cooperating with a locking bolt. This bolt has an operating component designed to cooperate alternately with a hole or a notch arranged in the locking ring with a preset angular offset, respectively in the first locked position to perform said positive locking of the ring in rotation when the operating component is inserted in the hole, and in a second unlocked position with formation of an internal link with a hang-up between the ring and finger when the operating component engages in the notch, moving from the second unlocked position to the first locked position being performed manually by a rotational movement of the ring causing the hang-up to be released at the beginning of travel following the reaction of the ring on the operating component, and insertion of the operating component in the hole at the end of travel for positive locking of the ring in rotation.

5 Claims, 6 Drawing Sheets

SNAP-HOOK WITH A LOCKING BOLT

BACKGROUND OF THE INVENTION

The invention relates to a snap-hook comprising a C-shaped fixed body, having a first end shaped as a securing element and a second end for articulation of a movable finger around a pivoting spindle between a closed position and an open position, said finger comprising:

- a latching element situated opposite the pivoting spindle to cooperate with the securing element in the closed position,
- a return spring to return the finger to the closed position,
- a locking ring mounted coaxially around the finger between a first locked position enabling positive locking of the finger in the closed position to be achieved and a second unlocked position enabling the finger to be moved to the open position, said ring being of a smaller length than that of the finger and being permanently separated from the spindle by an axial gap.

Known snap-hooks equipped with locking rings of the kind mentioned generally use screw or bayonet type rings. In the case of screw rings, the ring has to be screwed several turns to move it in translation along the finger over a travel of a few millimeters so as to efficiently cover the securing element of the body when going from the second unlocked position to the first locked position. This screwing operation is tedious and requires a relatively long time to achieve. The same shortcoming is encountered when unscrewing to move the ring from the first locked position to the second unlocked position. In the case of a bayonet ring, locking of the finger in the closed position is achieved by a first upwards translational movement of the ring against the force of a spring followed by a second limited rotational movement. After it has been released, the ring is subjected to a slight retraction movement and is held in the first locked position by the elastic force of the spring. Nuisance unlocking of the ring does still however remain possible in the presence of friction forces exerted by the rope.

SUMMARY OF THE INVENTION

The object of the invention consists in providing a snap-hook equipped with a rotary safety ring with positive locking which is easy to handle.

The snap-hook according to the invention is characterized in that the finger is equipped with a locking bolt having an operating component designed to cooperate alternately with a hole or a notch arranged in the locking ring with a preset angular offset, respectively in the first locked position to perform said positive locking in rotation of said ring when the operating component is inserted in the hole, and in a second unlocked position with formation of an internal link with a hang-up between the ring and said finger when the operating component engages in the notch, movement from the second unlocked position to the first locked position being achieved manually by a rotational movement of the ring causing the hang-up to be released at the beginning of travel following the reaction of the ring on the operating component, and insertion of the operating component in the hole at the end of travel for positive locking of the ring in rotation.

The manual movement of the ring in rotation from the second unlocked position to the first locked position and vice-versa is performed either clockwise or in the opposite direction.

According to a preferred embodiment, the locking bolt comprises a telescopic pin fitted in an orifice of the finger and associated to a compression spring urging the pin in a radial direction for engagement in the hole or the notch of the ring, movement from the first locked position to the second unlocked position requiring the pin to previously depressed to an inactive position before the ring is actuated in rotation.

According to one feature of the invention, the hole passes radially through the wall of the locking ring, whereas the notch is blind and presents a conjugate shape to that of the stopping surface of the pin.

BRIEF DESCRIPTION OF THE DRAWINGS

Other advantages and features will become more clearly apparent from the following description, given as a non-restrictive example only and represented in the accompanying drawings, in which.

DETAILED DESCRIPTION OF THE PREFERRED EMBODIMENT

Figures 1, 2:
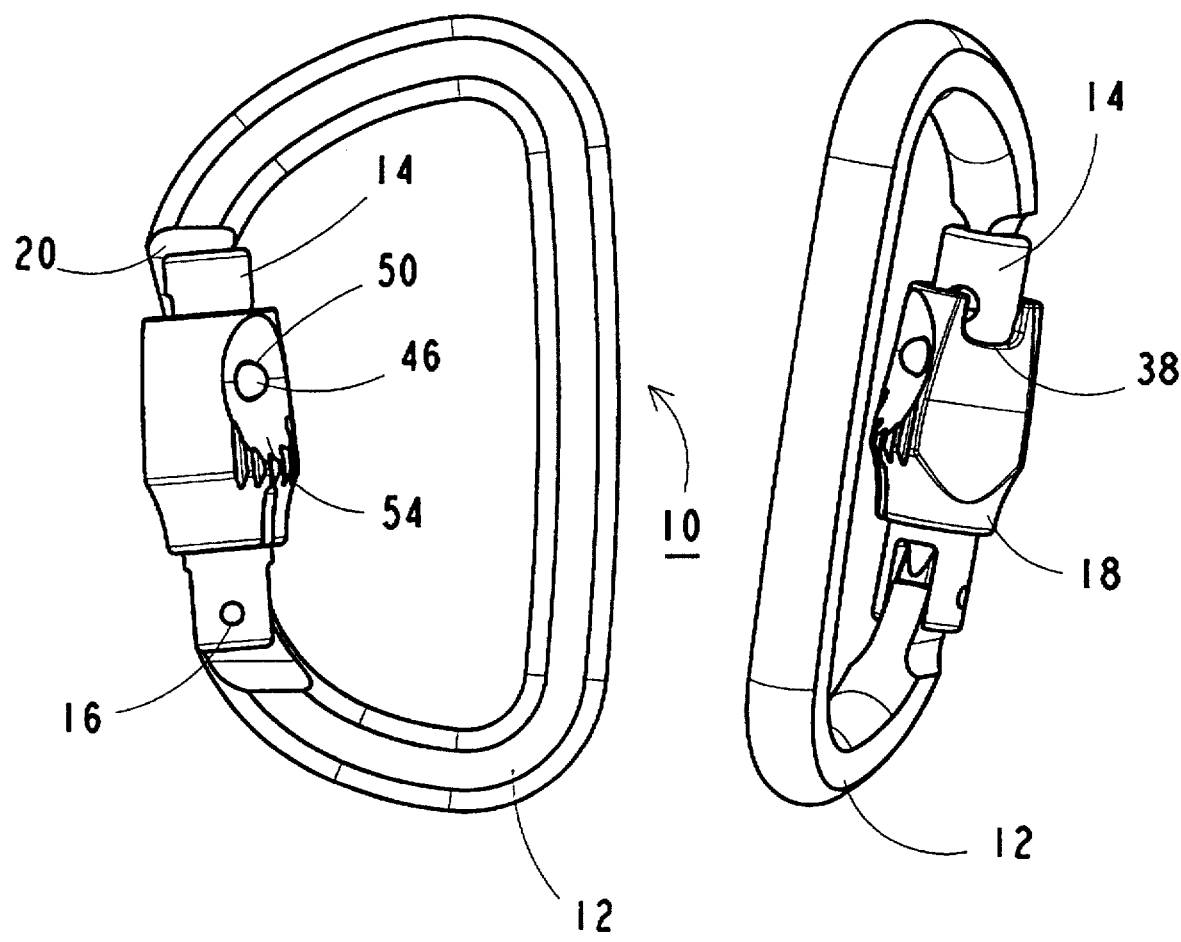
FIGS. 1 and 2 are elevational views of the snap-hook according to the invention, the finger being closed and locked by the locking ring.
Figure 3:
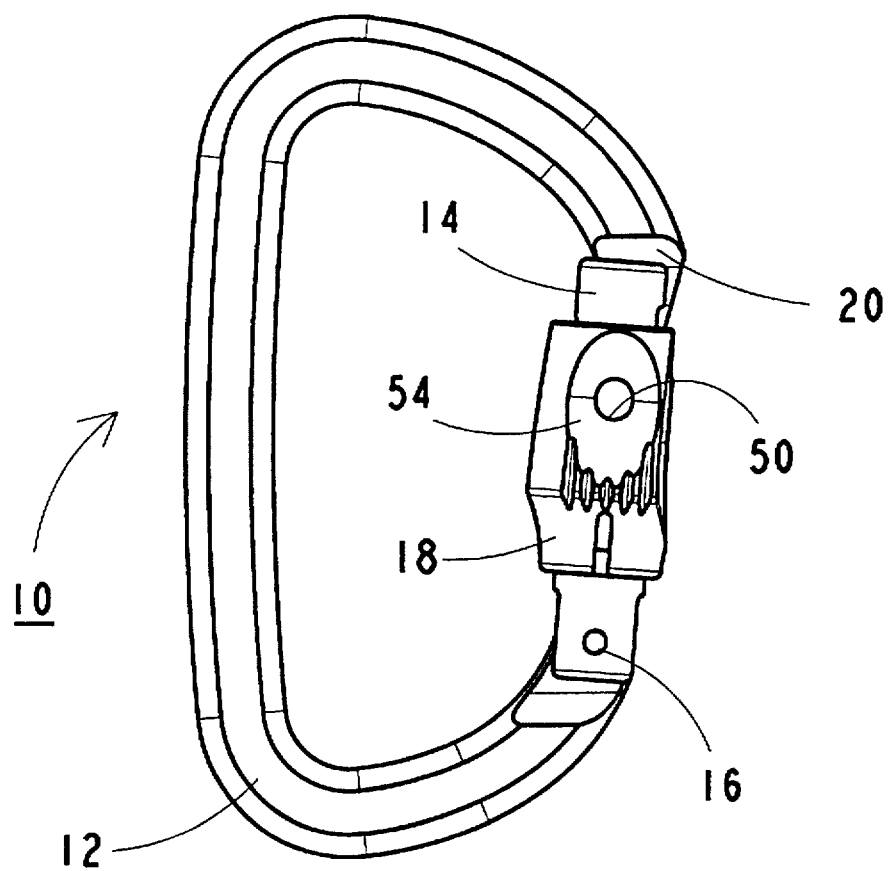
FIG. 3 shows an identical view to FIG. 1, with the finger closed in the unlocked state of the ring.

In FIGS. 1 to 7, a snap-hook 10 for mountain climbing comprises a C-shaped metallic body 12 and a movable finger 14 pivotally mounted on a spindle 16 located at the bottom end of the body 12. The metallic finger 14 is equipped with a coaxial locking ring 18, mounted with a slight radial clearance in free rotation around the finger 14 between a first locked position (FIGS. 1, 2 and 5) and a second unlocked position (FIG. 3).

In the unlocked position of FIG. 3, the finger 14 is movable towards the inside of the body 12, allowing opening of the snap-hook (FIG. 4) to enable either a rope or a strap to be inserted, or to enable the snap-hook to be secured to a securing device (not represented).

The top end of the body 12 is provided with a male securing element 20 designed to engage in a female latching element 22 of the finger 14 when returning to the closed position (FIG. 1) due to the action of a return spring 24. The male element 20 presents a reverse T-shaped structure comprising a tab extended by a protuberance in the form of a cap. The female element 22 of the finger 14 is situated opposite the pivoting spindle 16 and comprises a recess of conjugate shape to the male element 20. The locking ring 18 presents a smaller length than that of the finger 14, and is permanently separated from the spindle 16 by an axial gap. The lower part of the ring 18 is provided with an annular collar 30 engaged with clearance in a groove 32 of the finger 14.

In the locked position, the upper part of the ring 18 is facing the protuberance of the male element 20, which prevents any pivoting of the finger 14 towards the inside when a thrust action is exerted perpendicularly with respect to the longitudinal direction of the ring 18.

The top edge of the locking ring 18 comprises a slot 38 allowing the protuberance of the male element 20 to pass when the ring 18 is in the second unlocked position. Opening of the finger 14 is then possible by a pushing action making the finger 14 pivot around the spindle 16 to the open position of FIG. 4.

The movable finger 14 is in addition equipped with a locking bolt 40 designed to positively lock the ring 18 in the first locked position. According to the embodiment of FIGS. 8 and 9, the locking bolt 40 comprises a telescopic pin 42 mounted in a radial orifice 44 of the finger 14, and provided with a rounded stopping surface 46, notably in the shape of a ball. The pin 42 is associated to a compression spring 48 housed in the orifice 44, and urging the stopping surface 46 in the radial direction.

The locking ring 18 is provided with a circular hole 50 allowing the stopping surface 46 of the pin 42 to protrude out in the first locked position. In this positive locking position (FIG. 8), any rotational movement of the ring 18 towards the second unlocked position is rendered impossible, and the finger 14 remains closed with total safety, regardless of any effort exerted on the finger 14.

The hole 50 through which the pin 42 passes is situated at the bottom of a gripping surface 54 in the form of a dish, which facilitates the pressing action of the locking bolt 40 for switching to the unlocked position.

A blind notch 56 is provided in the cylindrical internal wall of the locking ring 18 at the level of the locking bolt 40, said notch being angularly offset from the hole 50 and presenting a conjugate shape to that of the rounded stopping surface 46 of the pin 42. In the unlocked position of the ring 18 illustrated in FIG. 9, the stopping surface 46 of the pin 42 engages in the blind notch 56 so as to form a hang-up. The disengagement threshold of this hang-up requires a certain force at the beginning of rotation of the ring 18, regardless of the direction of rotation.

The angular offset between the hole 50 and the notch 56 of the locking ring 18 corresponds to the travel necessary to go from the first locked position to the second unlocked position and vice-versa.

The return spring 24 extends in a blind eccentric bore 60 of the finger 14, the base of the spring 24 being associated to a tail 62 bearing on an edge 64 of the body 12. The flexion of the spring 24 when the finger 14 is opened tends to bring it automatically back to the closed position as soon as the user releases it.

Figure 8:
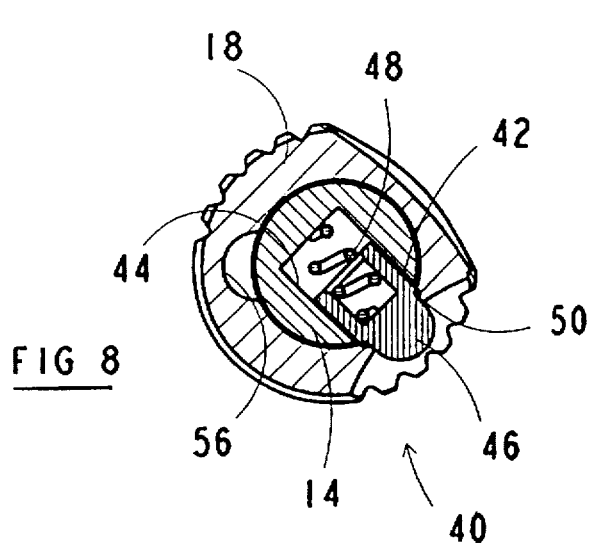
FIGS. 8 and 9 represent of the sectional views along the line 8—8 of FIG. 7, respectively in the locked state and in the unlocked state of the ring.

Operation of the snap-hook 10 according to FIGS. 1 to 9 is as follows:

In the closed position of the snap-hook 10 (FIGS. 1, 2 and 5), the locking bolt 40 is active to lock the locking ring 18 in the first locked position. The upper part of the ring 18 constitutes a stopping means which prevents any pivoting movement of the finger 14 towards the inside of the body 12. The spring 48 keeps the stopping surface 46 of the locking bolt 40 in the hole 50 of the ring 18 to immobilize the latter in rotation (FIG. 8). The stopping surface 46 is protruding out and can be seen from outside.

Opening of the movable finger 14 is possible following the rotational movement of the ring 18 to the second unlocked position, which movement is only authorized after the locking bolt 40 has been previously unlocked which is achieved by a pushing action of the pin 42 against the return force of the compression spring 48.

Figure 4:
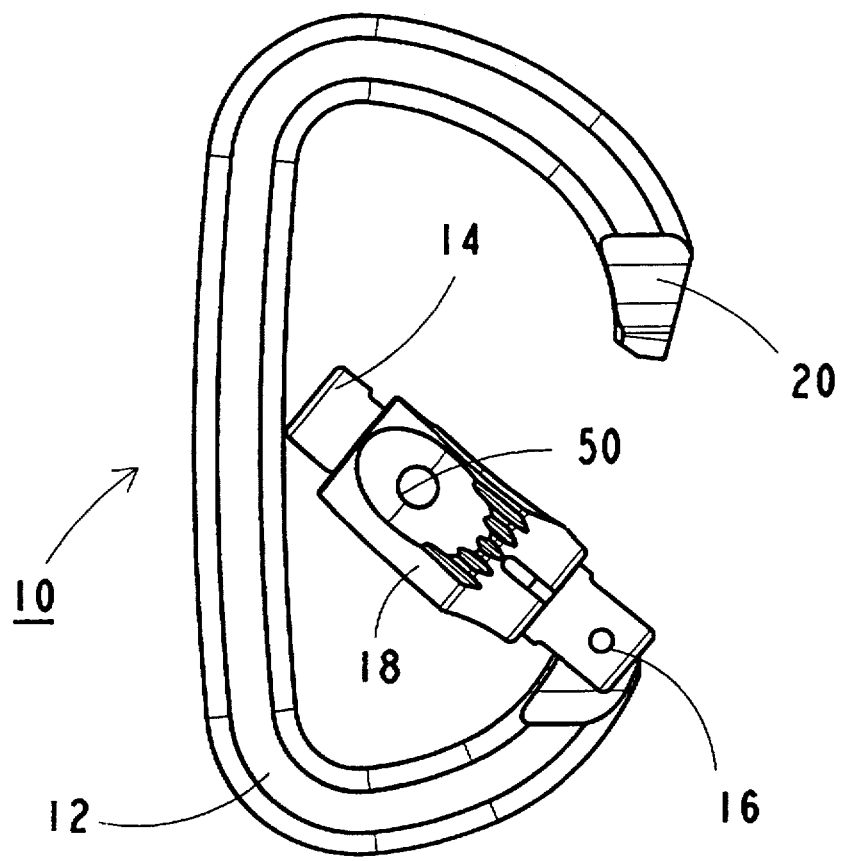
FIG. 4 is an identical view to FIG. 3, with the finger open.
Figure 5:
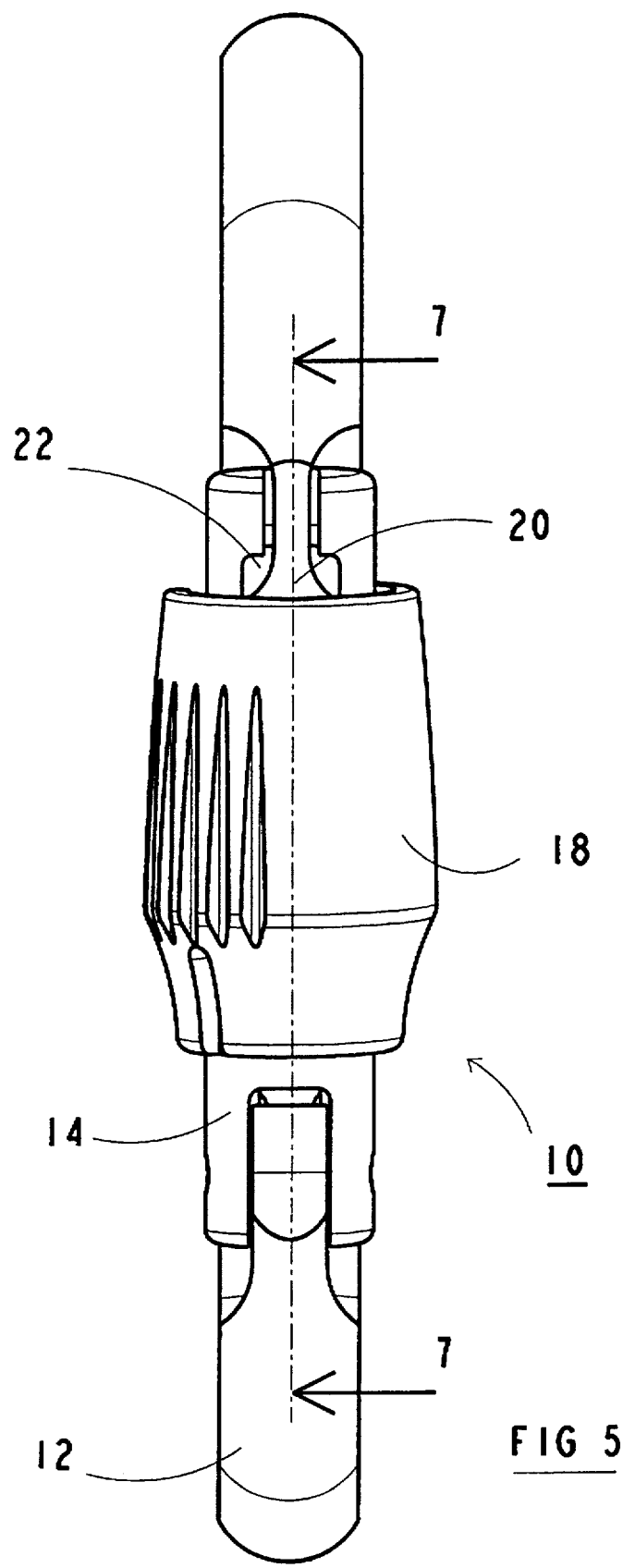
FIGS. 5 and 6 show respective side views of FIGS. 1 and 3.
Figure 6:
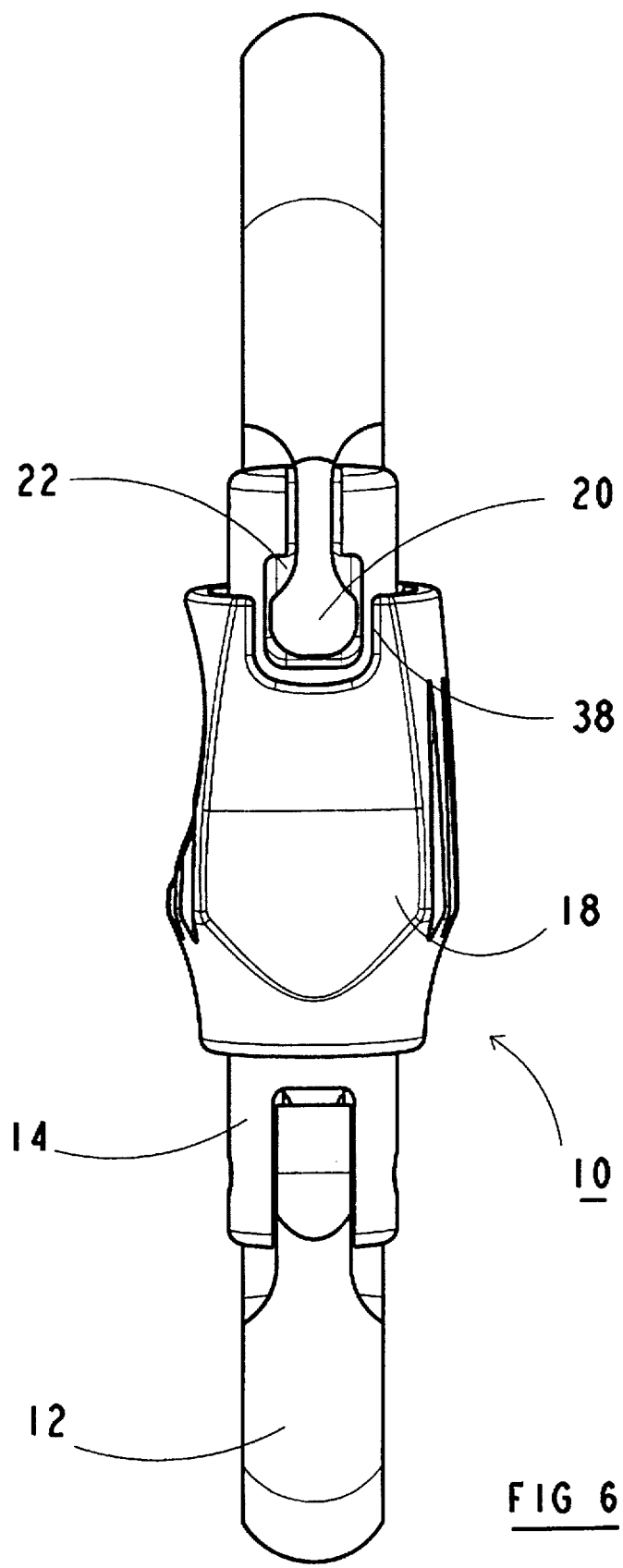
Figure 7:
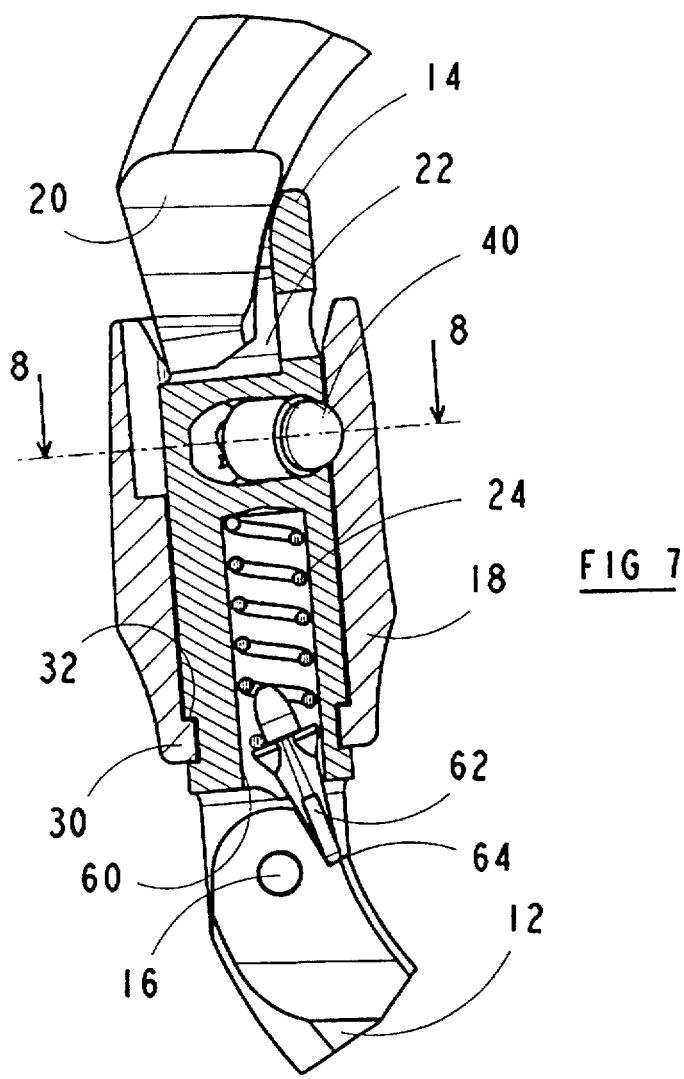
FIG. 7 is a sectional view of the finger of FIG. 1.
Figure 9:
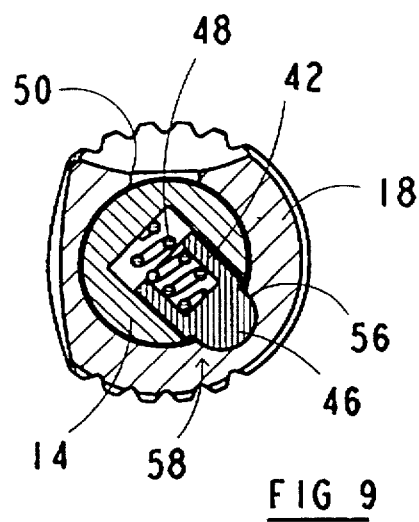

The manual rotational movement of the ring 18 can be performed clockwise, or in the reverse direction, and the second unlocked position is achieved when the notch 56 of the ring 18 arrives opposite the pin 42 of the finger 14. The spring 48 the n pushes the stopping surface 46 into the notch 56 so as to constitute a hang-up 58 which keeps the ring 18 in said second position (FIG. 9). This internal link with hang-up 58 between the ring 18 and finger 14 is not visible from the outside. The ring 18 is in the unlocked position of FIGS. 3 and 6, and it is then possible to pivot the finger 14 to the open position (FIG. 4).

After the pushing force has been released, the return spring 24 automatically returns the movable finger 14 to the closed position (FIG. 3). The locking bolt 40 nevertheless remains in the second unlocked position indicated in FIG. 9. Going to the first locked position requires manual actuation of the locking ring 18 in rotation causing at the beginning of travel release of the hang-up 58 following the reaction of the ring 18 on the stopping surface 46 resulting in retraction of the pin 42, and at the end of t ravel insertion of the stopping surface 46 in the hole 50 for positive locking of the ring 18. The manual actuating movement of the locking ring 18 can be performed either clockwise or in the opposite direction.

The locking ring 18 is made of metallic or plastic material an d the locking bolt 40 could be achieved differently, notably by means of a pivoting latching lever.

We claim:

1. A snap-hook comprising a C-shaped fixed body, having a first end shaped as a securing element and a second end for articulation of a movable finger around a pivoting spindle between a closed position and an open position, said finger comprising:

a latching element situated opposite the pivoting spindle to cooperate with the securing element in the closed position, a return spring to return the finger to the closed position, a locking ring mounted coaxially around the finger between a first locked position enabling positive locking of the finger in the closed position to be achieved and a second unlocked position enabling the finger to be moved to the open position, said ring being of a smaller length than that of the finger and being permanently separated from the spindle by an axial gap, wherein the finger is equipped with a locking bolt having an operating component designed to cooperate alternately with a hole or a notch arranged in the locking ring with a preset angular offset, respectively in the first locked position to perform said positive locking in rotation of said ring when the operating component is inserted in the hole, and in a second unlocked position with formation of an internal link with a hang-up between the ring and said finger when the operating component engages in the notch, movement from the second unlocked position to the first locked position being achieved manually by a rotational movement of the ring causing the hang-up to be released at the beginning of travel following the reaction of the ring on the operating component, and insertion of the operating component in the hole at the end of travel for positive locking of the ring in rotation.

2. The snap-hook according to claim 1, wherein the manual movement of the ring in rotation from the second unlocked position to the first locked position and vice-versa is performed either clockwise or in the opposite direction.

3. The snap-hook according to claim 1, wherein the locking bolt comprises a telescopic pin fitted in an orifice of the finger and associated to a compression spring urging the pin in a radial direction for engagement in the hole or the notch of the ring, movement from the first locked position to the second unlocked position requiring the pin to previously depressed to an inactive position before the ring is actuated in rotation.

4. The snap-hook according to claim 3, wherein the hole passes radially through the wall of the locking ring, whereas the notch is blind and presents a conjugate shape to that of the stopping surface of the pin.

5. The snap-hook according to claim 1, wherein the top edge of the locking ring is provided with a slot allowing the latching element to move into or out of the securing element when the locking ring is in the second unlocked position.

* * * * *